United States Patent
De Rauw

(10) Patent No.: US 12,547,355 B2
(45) Date of Patent: Feb. 10, 2026

(54) METHOD OF PREPARING IMAGE JOB DATA FOR IMAGING A MASK LAYER, ASSOCIATED CONTROLLER AND MASK LAYER IMAGING SYSTEM

(71) Applicant: XSYS PREPRESS NV, Ypres (BE)

(72) Inventor: Dirk Ludo Julien De Rauw, Ninove (BE)

(73) Assignee: XSYS PREPRESS NV, Ypres (BE)

( * ) Notice: Subject to any disclaimer, the term of this patent is extended or adjusted under 35 U.S.C. 154(b) by 202 days.

(21) Appl. No.: 18/474,466

(22) Filed: Sep. 26, 2023

(65) Prior Publication Data
US 2024/0103780 A1    Mar. 28, 2024

(30) Foreign Application Priority Data

Sep. 28, 2022   (NL) ..................................... 2033172

(51) Int. Cl.
| | | |
|---|---|---|
| *G06F 3/12* | (2006.01) | |
| *G06K 15/02* | (2006.01) | |
| *H04N 1/387* | (2006.01) | |

(52) U.S. Cl.
CPC .......... *G06F 3/1219* (2013.01); *G06F 3/1215* (2013.01); *G06F 3/1242* (2013.01); *G06F 3/1253* (2013.01); *G06F 3/1265* (2013.01); *G06K 15/1853* (2013.01); *G06K 15/189* (2013.01); *H04N 1/3872* (2013.01)

(58) Field of Classification Search
CPC .... G06F 3/1219; G06F 3/1215; G06F 3/1242; G06F 3/1253; G06F 3/1265; H04N 1/3872; G06K 15/1853; G06K 15/189
See application file for complete search history.

(56) References Cited

U.S. PATENT DOCUMENTS

| | | | | |
|---|---|---|---|---|
| 11,418,683 | B1* | 8/2022 | Ramsey | H04N 1/2353 |
| 2006/0072159 | A1* | 4/2006 | Eschbach | B41M 3/148 |
| | | | | 358/3.06 |
| 2009/0086233 | A1* | 4/2009 | Shirai | H04N 1/2369 |
| | | | | 358/1.9 |
| 2010/0150433 | A1* | 6/2010 | Wang | H04N 1/00864 |
| | | | | 382/162 |
| 2011/0299105 | A1* | 12/2011 | Morrison | G06T 11/40 |
| | | | | 358/1.9 |
| 2014/0355069 | A1* | 12/2014 | Caton | H04N 1/00883 |
| | | | | 382/100 |

(Continued)

FOREIGN PATENT DOCUMENTS

WO    2021110831 A1    6/2021

OTHER PUBLICATIONS

Search Report and Written Opinion, Netherlands Patent Application 2033172, mailed Jan. 21, 2023.

*Primary Examiner* — Nicholas Pachol
(74) *Attorney, Agent, or Firm* — KDW Firm PLLC

(57) ABSTRACT

A method of preparing image job data for imaging a mask layer includes receiving at least one raster image file, preparing image job data for imaging the mask layer, the preparing comprising: including data relative to the at least one raster image file in the image job data so as to image at least one corresponding image area of the mask layer; determining a non-functional area of the mask layer outside of the at least one corresponding image area; and including filling imaging data in said image job data for imaging said non-functional area.

26 Claims, 12 Drawing Sheets

(56) References Cited

U.S. PATENT DOCUMENTS

| | | | |
|---|---|---|---|
| 2015/0317814 A1* | 11/2015 | Johnston | G06T 11/60 358/1.18 |
| 2016/0210088 A1* | 7/2016 | Van Den Branden | G06F 3/1219 |
| 2016/0375718 A1* | 12/2016 | Van Garsse | G06F 3/1251 52/311.1 |
| 2018/0035006 A1* | 2/2018 | Bermundo | G06F 3/1256 |
| 2021/0206190 A1* | 7/2021 | Barbier | B41N 1/12 |
| 2022/0063264 A1* | 3/2022 | Hauf | H04N 1/2346 |
| 2022/0261975 A1* | 8/2022 | Hershman | G06F 3/1219 |
| 2023/0362312 A1* | 11/2023 | Inoue | H04N 1/40012 |

\* cited by examiner

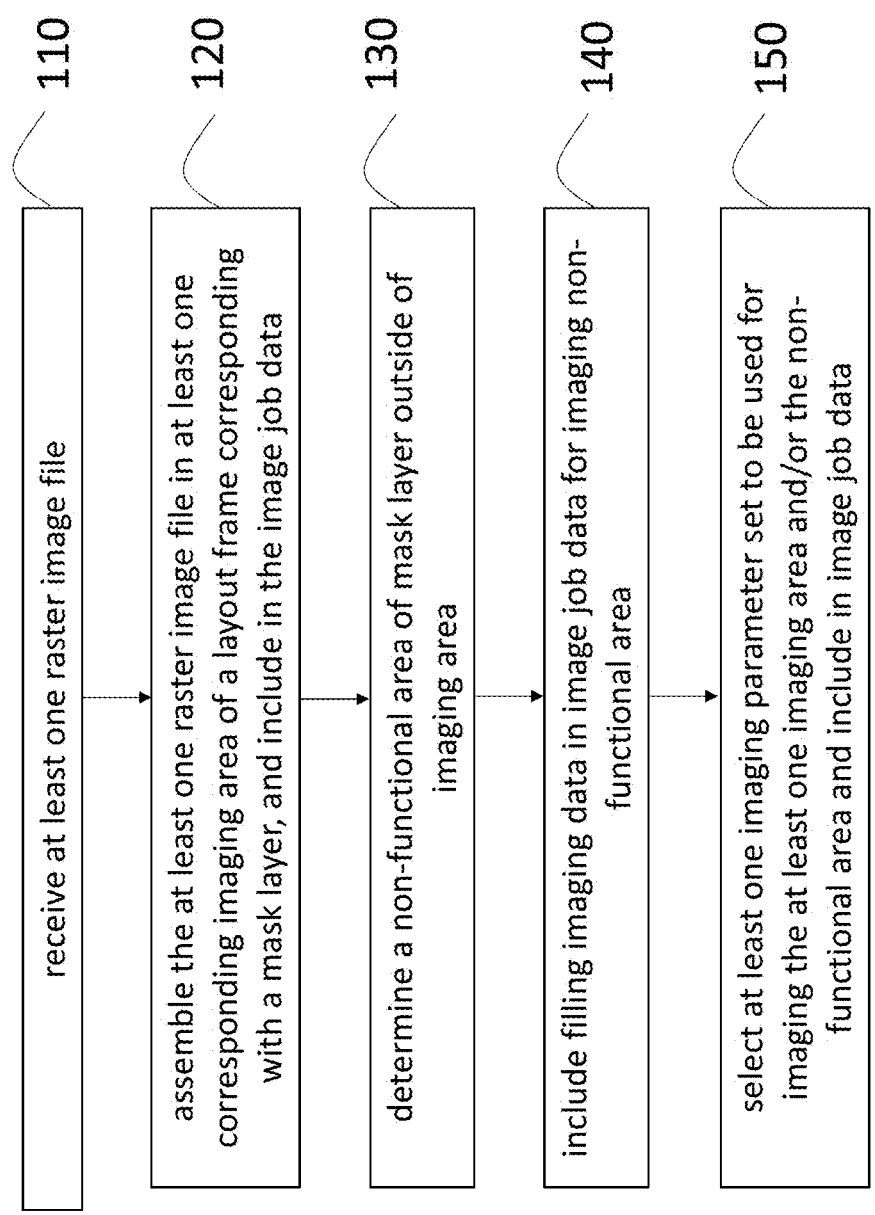

METHOD OF PREPARING IMAGE JOB DATA FOR IMAGING A MASK LAYER, ASSOCIATED CONTROLLER AND MASK LAYER IMAGING SYSTEM

CROSS-REFERENCE TO RELATED APPLICATIONS

This application claims priority to Netherlands patent application NL2033172, filed Sep. 28, 2022, the entirety of which application is incorporated by reference herein.

FIELD OF THE INVENTION

The field of the invention relates to a method of preparing image job data for imaging a mask layer in the field of printing technology. Various embodiments in this document relate to methods of preparing image job data for imaging a mask layer, the associated controller, and the associated mask layer imaging system.

DESCRIPTION OF RELATED ART

In known methods of preparing image job data for imaging a mask layer, typically first several raster image files are received by a controller. Each raster image file comprises imaging pixels and non-imaging pixels. Data from the raster image files are then assembled on an area corresponding to a relief precursor plate or sleeve. Data from each raster image file typically correspond to at least one image area on the mask layer. Outside of the at least one image area there is a non-functional area which does not contain any imaging pixels.

The mask layer is then imaged using the prepared image job data. During the imaging the imaging pixels are transferred to the mask layer as ablated spots or spots which undergo a change in transmission for electromagnetic radiation used to cure the photosensitive layer. When the photosensitive layer of the relief precursor plate, covered by the imaged mask layer, undergoes curing for example by electromagnetic radiation, the areas exposed through the imaged spots are cured while the areas covered by the non-imaged parts of the mask layer remain uncured. The photosensitive layer, together with the mask layer is then developed, e.g., treated with a liquid (e.g. solvent or water) in a washing process to wash away the uncured parts of the photosensitive layer and the mask layer, or thermally developed with the aid of a developing material (e.g. a non-woven polymer web). Thus, one obtains a relief plate.

To maintain the effectiveness of the washing process the concentration of polymer in a tank of a washer, which was in the photosensitive layer and has been washed away, must be kept below a maximum. This may require addition of a large quantity of fresh liquid during the washing process. The larger the non-imaged areas on the mask layer are, generally more liquid is needed during the washing process. The quantity of liquid needed also increases with the increasing depth of the reliefs on the relief plate. The quantity of liquid needed in the washing process also increases with higher quality requirements which demand lower concentrations of polymer in the tank. During the washing process, the areas of the mask layer and the photosensitive layer corresponding to the non-functional area need to be washed away by liquid. Thus, there is a need to reduce the amount of liquid or developing material needed in order to make the process more efficient and more ecological friendly.

SUMMARY OF THE INVENTION

Some embodiments of the present disclosure relate to a method of preparing image job data for imaging a mask layer which reduces the amount of material that needs to be removed during development, e.g. which uses less liquid during the washing process after the relief precursor has been exposed and cured or which removes less material during thermal development, while keeping the high quality of the relief plate obtained after the development process.

According to a first aspect of the disclosure there is provided a method of preparing image job data for imaging a mask layer. The method comprises receiving at least one raster image file and preparing image job data for imaging the mask layer. The preparing comprises including data relative to the at least one raster image file in the image job data so as to image at least one corresponding image area of the mask layer, determining a non-functional area of the mask layer outside of the at least one corresponding image area; and including filling imaging data in said image job data for imaging said non-functional area.

The non-functional area after the development process is typically useless and discarded. For example, after the relief plate is cured it is typically cut into smaller parts each corresponding to the image areas. The cutting lines go right through the non-functional area Thanks to the present disclosure, by adding imaging pixels in the non-functional area a part of the non-functional area is also imaged. The parts on the relief precursor corresponding to the imaging pixels in the non-functional area will therefore also be cured and not be washed away by liquid. In this way the quantity of liquid required to treat the relief precursor in the washing process is reduced without compromising the quality of the relief plate eventually obtained. Also, when a thermal development process is used, less material needs to be removed and finally discarded.

Preferably, preparing the image job data comprises preparing a descriptive job file including references
  to the at least one raster image file or to at least one modified raster image based on the received at least one raster image file, and
  to a filling raster image file for imaging said non-functional area.

The descriptive job file is then used in combination with the at least one raster image file or the at least one modified raster image file and the filling raster image file. A modified raster image file may correspond to a received raster image file on which a surface screening pattern is applied and more generally on which any kind of image processing has been performed.

In this manner, it can be avoided that complex raster image processing is needed. Indeed, in some prior art solutions, when multiple raster image files have to be imaged on a plate, a combined raster image file is prepared including the multiple raster image files. According to embodiments of the invention, this is no longer needed.

Preferably, the data relative to the at least one raster image file comprise image position data indicating a position of the at least one corresponding image area on the mask layer and/or the filling imaging data comprise filling position data indicating a position of the non-functional area. The image position data and/or the filling position data may then be included in the descriptive job file.

It is noted that all relevant data may be put in a single descriptive job file or in multiple descriptive jobs files.

In a typical embodiment the at least one raster image file comprises at least two raster image files. Often, the raster image files have the same resolution but in some embodiments, the raster image files may have different resolutions. It is noted that the resolution, typically expressed in dpi, of the raster image file itself will typically correspond to the resolution used for imaging the pixels in the mask layer, but the resolution used for imaging may also be different.

Preferably, the filling image data is chosen to reduce the quantity of liquid required to treat the relief precursor.

Preferably, the filling imaging data is such that at least 10%, preferably at least 20%, preferably at least 30%, more preferably at least 50%, even more preferably at least 70% of the pixels added in said non-functional area are imaging pixels. According to some other embodiments the filling imaging data is such that less than 10% of the pixels added in said non-functional area are imaging pixels.

In the non-functional area, only the portions of the photosensitive layer corresponding to the non-imaging pixels will be washed away during the washing process. By adding imaging pixels to a significant portion of the non-functional area the quantity of liquid used during the washing process will be significantly reduced or the amount of material removed during thermal development will be significantly reduced.

Preferably, the method further comprises including in the image job data at least one imaging parameter set of at least one imaging parameter for imaging the non-functional area, preferably taking in account a total amount of imaging time required for imaging the at least one image area and the non-functional area using the at least one imaging parameter set. The at least one imaging parameter set or a reference thereto may then be included in the descriptive job file.

By specifying at least one imaging parameter set for imaging the non-functional area, e.g. in the descriptive job file, the imaging can be further improved. Further, by reducing or minimising the amount of time spent on imaging the non-functional area a good balance can be achieved between the reduction in liquid use or in the amount of removed material during the development process and an increase in time for imaging the non-functional area.

Similarly, the method may comprise including in the image job data at least one imaging parameter set of at least one imaging parameter for imaging the at least one image area. Such at least one imaging parameter set or a reference thereto may then also be included in the descriptive job file.

An imaging parameter set may comprise one or more of the following parameters: a resolution used for imaging pixels in the non-functional area or in the at least one image area, a power of an imaging beam for imaging the non-functional area or in the at least one image area, a size of an imaging beam for imaging the non-functional area or in the at least one image area, a speed of an imaging beam for imaging the non-functional area or in the at least one image area, an imaging beam head to be used, the number of imaging heads to be used, a rotational speed of a drum on which the plate is fixed during imaging of the non-functional area. Such imaging parameters may influence the time needed for the imaging of the non-functional area or in the at least one image area and can be appropriately chosen to reduce or optimize this time.

In an exemplary embodiment, including the at least one imaging parameter set for imaging the non-functional area comprises selecting at least one imaging parameter set from a list of imaging parameter sets for imaging the non-functional area to reduce or optimize a total amount of imaging time required for imaging the at least one image area and the non-functional area.

Preferably, an imaging parameter set selected for imaging at least a part of the non-functional area includes a resolution identical to the resolution used for imaging an image area of the at least one image area.

Imaging at a first resolution is carried out on a first pass of the imaging beams. Imaging at a different resolution typically requires a separate, second pass after the first pass has ended. This increases the total amount of time for imaging the mask layer. By choosing the same resolution to image one image area and at least a part of the non-functional area these two areas can be imaged in a single pass, which may reduce the total duration required for imaging the mask layer.

In a further developed embodiment, the at least one imaging parameter set may comprise a first imaging parameter set for a first portion of the non-functional area and a second imaging parameter set for a second portion of the non-functional area.

In an exemplary embodiment, including in the image job data the at least one imaging parameter set for imaging the non-functional area comprises specifying a first resolution (R1) for imaging a first non-functional zone, and a second different resolution (R2) for imaging a second non-functional zone, wherein preferably the first non-functional zone is adjacent a first image area of said at least one image area which is imaged with the first resolution and the second non-functional zone is adjacent a second image area which is imaged with the second resolution.

By having at least two non-functional zones having different imaging pixel resolutions, the total duration of time for imaging the mask layer can be reduced or optimized in a flexible way, compared to the case where the entire non-functional area has one single resolution. In this way time for imaging the non-functional area can be further reduced.

In another exemplary embodiment including in the image job data the at least one imaging parameter set for imaging the non-functional area comprises specifying a same resolution for imaging substantially the entire non-functional area.

By adding in the non-functional area the imaging pixels of only one resolution, the method can be implemented in a simple manner whilst still allowing some optimizing of the time needed for the imaging by appropriately choosing the resolution.

Optionally, including filling imaging data in said image job data is such that a border around at least one of the at least one image area is not imaged.

Including a border of non-imaging pixels results in a recessed portion which facilitates cutting the relief plate into different parts corresponding to the at least one image area.

Preferably, the non-functional area is determined so that the combination of the at least one image area and the non-functional area cover substantially the entire printable area of the mask layer. In this way, the removed material is further reduced.

In an embodiment, the image job data may comprise a combined raster image file including pixel data from the at least one raster image file arranged in at least one corresponding image area of a mask area, and pixel data for the non-functional area of the mask area corresponding to the filling imaging data. However, this is not a preferred embodiment.

Preferably, including filling imaging data in said image job data for imaging said non-functional area comprises including a pattern of imaging and non-imaging pixels in said non-functional area, optionally with the exception of a border of non-imaging pixels around at least one of the at least one image area. The pattern may comprise groups of at least four adjacent imaging pixels, preferably at least six adjacent imaging pixels, separated by non-imaging pixels, e.g. squares of at least four adjacent imaging pixels separated by lines. Preferably, the pattern is a repetitive pattern with a repetition distance between 1 and 50 mm, more preferably between 2 and 40 mm, even more preferably between 3 and 35 mm, e.g. between 5 mm and 35 mm.

According to an exemplary embodiment, the method further comprises overlaying at least one surface screen of imaging and non-imaging pixels over a solid area and/or a half-tone area of the at least one raster image file to obtain at least one modified raster image file, wherein said surface screen may be the same or different for each raster image file to be included, wherein the image job data comprise the at least one modified raster image file or a reference to the at least one modified raster image file. Preferably, the pattern used for the non-functional area is different from a pattern of the surface screen.

Surface screens improve the ink transfer from the relief plate to a medium such as paper, and thus improve the printing quality. Additional technical advantages of using surface screens are mentioned in the patent application NL 2 031 133 which is included herein by reference.

Typically, the repetition distance is significantly larger for the pattern used for the non-functional area compared to the surface screen pattern.

Some embodiments of the present disclosure relate to a computer program comprising computer-executable instructions to control an embodiment of the method as described above in relation to any one of the aspects of the disclosure, when the program is run on a computer.

Some embodiments of the present disclosure relate to a digital data storage medium encoding a machine-executable program of instructions to perform any one of the steps of the method as described above in relation to any one of the aspects of the disclosure.

Some embodiments of the present disclosure relate to a computer program product comprising computer-executable instructions for controlling or performing the method as described above in relation to any one of the above aspects of the disclosure, when the program is run on a computer.

Preferably, the or each of the at least one image areas has a size smaller than 75% of the size of the mask layer, preferably smaller than 50%, more preferably smaller than 40%, for example smaller than 30%.

According to another aspect there is provided a controller configured to prepare image job data for imaging a mask layer which needs to be imaged in at least one image area based on at least one raster image file, the controller comprising a filling module configured to determine a non-functional area of the mask layer outside of at least one image area, and to include filling imaging data in said image job data for imaging said non-functional area.

Preferably, the filling module is configured to generate a filling raster image file for imaging the non-functional area. By generating such a separate filling raster image file, such file can be easily treated by an imager.

Preferably, the filling module is configured to include a reference to the filling raster image file in the image job data, e.g. in a descriptive job file, optionally in combination with position data indicating where the data from the filling raster image file is to be used on the mask layer.

Preferably, the controller further comprises a layout determining module configured to receive at least one raster image file, and to include data relative to the at least one raster image file in the image job data so as to image the at least one corresponding image area of the mask layer. It is noted that the layout determining module and the filling module may be implemented as separate software modules running on the same or on a different computer.

Preferably, the layout determining module is configured to include a reference to the at least one raster image file or to at least one modified raster image file based on the at least one raster image file in the image job data, e.g. in a descriptive job file, optionally in combination with position data indicating where the data from the at least one (modified) raster image file is to be used on the mask layer.

In this way, the raster image files can be used in a simple manner without requiring additional raster image processing steps.

Preferably, the controller is configured to transmit the image job data as a descriptive job file together with the filling raster image file and the at least one raster image file to an imager. In this way the imager receives all information needed to perform the imaging.

Preferred embodiments of the controller are disclosed in the enclosed dependent claims. The advantages set out above for the method apply mutatis mutandis for the controller.

Another embodiment concerns an imaged mask layer obtained according to the method described above.

BRIEF DESCRIPTION OF THE DRAWINGS

The above and further aspects of the disclosure will be explained in more detail below on the basis of a number of embodiments, which will be described with reference to the appended drawings.

In the drawings:

FIG. 1 is a schematic flow chart of an embodiment of the method;

DESCRIPTION OF EMBODIMENTS

Figure 2A:
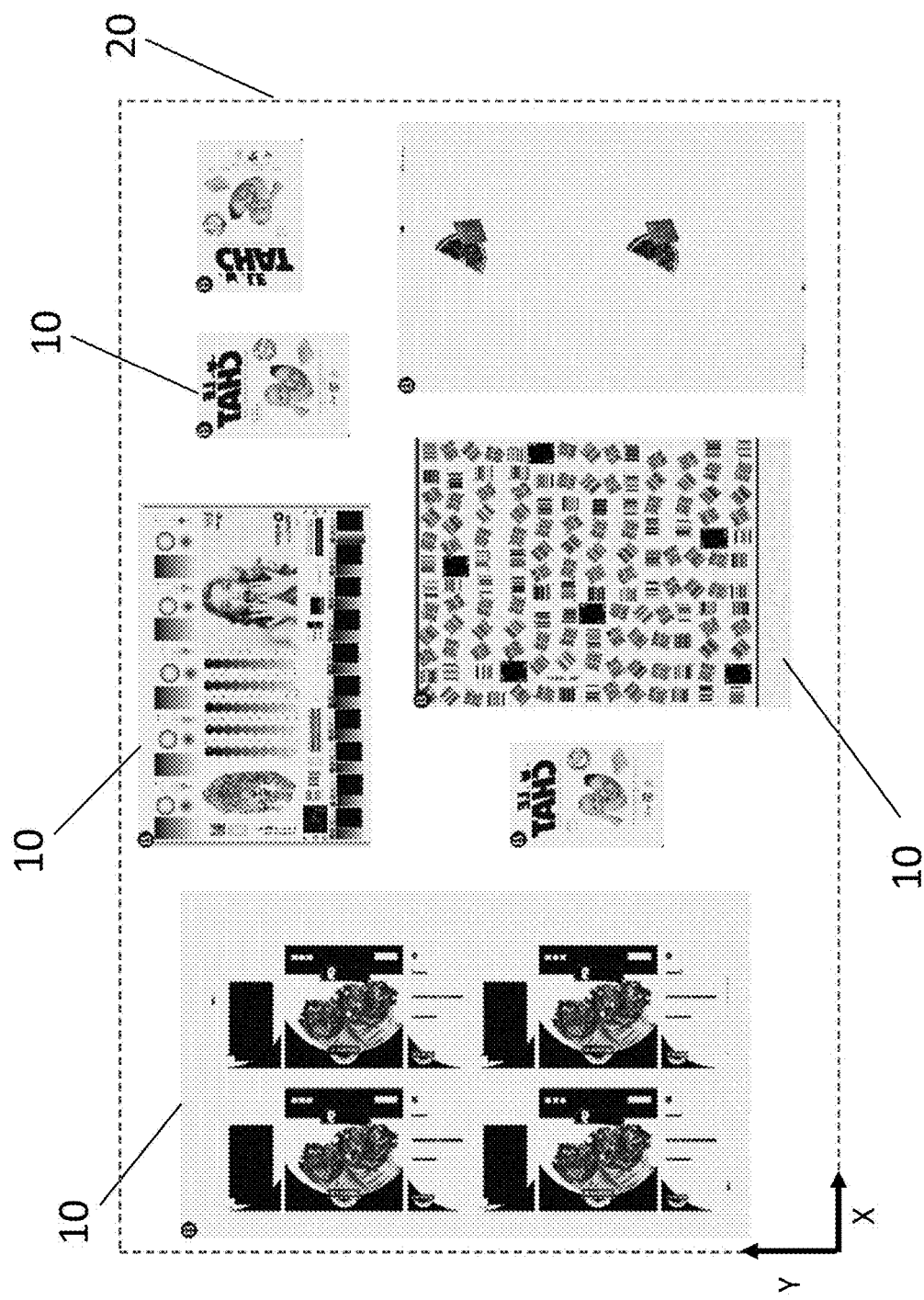
FIG. 2A shows the layout of the raster images files on corresponding image areas corresponding to areas of a relief precursor on which the images have to be arranged.

Flexographic printing or letterpress printing are techniques which are commonly used for high volume printing.

Flexographic or letterpress printing plate are relief plates with printing elements, typically called reliefs or dots, protruding above non-printing elements in order to generate an image on a recording medium such as paper, cardboard, films, foils, laminates, etc. Also, cylindrically shaped printing plates or sleeves may be used.

Various methods exist for making flexographic printing plate precursors. According to conventional methods flexographic printing plate precursors are made from multilayer substrates comprising a backing layer and one or more photocurable layers (also called photosensitive layers). Those photocurable layers are imaged by exposure to electromagnetic radiation through a mask layer containing the image information or by direct and selective exposure to light e.g. by scanning of the plate to transfer the image information in order to obtain a relief plate.

In flexographic printing, ink is transferred from a flexographic plate to a print medium. More in particular, the ink is transferred on the relief parts of the plate, i.e. in the halftone dots or solid reliefs, and not on the non-relief parts. During printing, the ink on the relief parts is transferred to the print medium. Greyscale images are typically created using half-toning using a screening pattern, preferably an AM screening pattern. By greyscale is meant, for a plate printing in a particular colour, the amount of that colour being reproduced. For example, a printing plate may comprise different half-tone dot regions to print with different densities in those regions. In order to increase the amount of ink transferred and to increase the so-called ink density on the substrate, an additional very fine structure may be applied to the surface of the printing dots, i.e. the relief areas. This fine surface structure is typically obtained by adding a fine high resolution sampling pattern to the image file, so that it is then transferred to the corresponding mask used for exposure.

Images reproduced by flexographic plates typically include both solid image areas and a variety of grey tone areas, also called halftone areas. A solid area corresponds with a single relief in the printing plate which is completely covered by ink so as to produce the highest density on a print material. A grey tone or halftone area corresponds with an area with multiple printing dots at a distance of each other, i.e. an area where the appearance of the printed image is of a density intermediate between pure white (total absence of ink) and pure colour (completely covered by ink). Grey areas are produced by the process of half-toning, wherein a plurality of relief elements per unit area is used to produce the illusion of different density printing. These relief elements are commonly referred to in the printing industry as 'halftone dots'. Image presentation is achieved by changing a percentage of area coverage (dot intensity) from region to region. Dot intensity may be altered by altering the dot size (AM screening) and/or the dot density, i.e. the dot frequency (FM screening).

In a flexographic plate, the halftone dots are relief areas having their surface at the top surface of the plate. The plate in the area surrounding the dot has been etched to a depth which reaches to a floor. The height of a halftone dot is the distance of the surface of the dot (and of the plate surface) to the floor. The halftone relief is the relief extending from the floor to the top surface.

FIG. 1 illustrate the various steps of an embodiment of a method of preparing image job data for imaging a mask layer. The method comprises the step of receiving at least one raster image file 110 and preparing image job data, typically in the form of a descriptive file with instructions for imaging the mask layer.

The preparing of image job data may comprise the step 120 of including data relative to the at least one raster image file in the image job data so as to image at least one corresponding image area of the mask layer. This data may be for example a reference to the at least one raster image file and positioning data indicating the position of the at least one corresponding image area on the mask layer. The preparing of image job data may further comprise the steps 130, 140 of determining a non-functional area of the mask layer outside of the at least one corresponding image area and including filling imaging data in said image job data for imaging said non-functional area. This filling imaging data may be a reference to the at least one filling raster image file and positioning data indicating the position of the corresponding non-functional area on the mask layer. Typically, the corresponding non-functional area will extend over substantially the entire surface of the mask layer with the at least one image area cut out thereof.

The at least one raster image file typically comprises at least two raster image files, and optionally the at least two raster image files may have different resolutions, and may be imaged with different resolutions. Also, the filling raster image file which is to be included in the non-functional area may be imaged with the same resolution or with a different resolution. The method preferably comprises the step of selecting at least one imaging parameter set for imaging the at least one image area and/or for imaging the non-functional area taking in account a total amount of imaging time required for imaging the at least one image area and the non-functional area using the at least one imaging parameter set. The at least one imaging parameter set may comprise one or more of the following parameters: a resolution used for imaging the pixels (typically the X and Y resolution are the same, but they could also be different), a power of an imaging beam for imaging, a size of an imaging beam for imaging, a speed of an imaging beam, an imaging beam head to be used, the number of imaging heads to be used, a rotational speed of a drum on which the mask layer is fixed, etc.

Below an example of a first portion of a descriptive job file is discussed. This first portion relates to a first raster image file "file1.tif" to be imaged in the mask layer. The descriptive job file may include a reference to the first raster image file, a position of the first raster image, a resolution for imaging pixels of the first raster image file, and an imaging mode associated with the first raster image file, wherein the imaging mode represents a preprogrammed set of imaging parameters to be used for imaging the pixels of the first raster image file.

```
"HeadB" :
{
    "ImagingMode"       : 424,
    "Power[%]"          : 100,
    "Resolution[dpi]"   : 1270,
    "StartX[pixels]"    : 15473,
    "StartY[pixels]"    : 45716,
    "Images"            :
    [
        {
            "Name"          : "file1.tif",
            "Xsize[pixels]" : 14176,
            "Ysize[pixels]" : 9436,
            "X[pixels]"     : 0,
            "Y[pixels]"     : 0,
            "XStartPixel"   : 0,
            "XEndPixel"     : 14175
        }
```

```
        ]
    }
```

In this example, the first raster image file "file1.tif" will be imaged by "Head B" using imaging mode 424 which represents a preprogrammed set of imaging parameters, wherein a power percentage of 100% of the power value included in the preprogrammed set is used, with a resolution of 1270 dpi. The field "StartX[pixels]" indicates the X-coordinate of a bottom left corner of an area for which imaging mode 424 and the resolution of 1270 dpi will be used (in this example the imaging mode and resolution will be used only for imaging the file "file1.tif" but in other examples these settings could also be used for imaging more than one raster image file, see the example below). The field "StartY[pixels]" indicates the Y-coordinate of a bottom left corner of an area for which imaging mode 424 and the resolution of 1270 dpi will be used The "Name" field contains a name of the first raster image file. The "Xsize[pixels]" field indicates the number of pixels of the first raster image file in the X direction and the "Ysize[pixels]" field indicates the number of pixels of the first raster image file in the Y direction. It is noted that it is not essential to include this data in the job file as it is included in the .tif file, but it may help the operator and/or the processing within the imager. The fields "X[pixels]" and "Y[pixels]" indicate X and Y coordinates of a bottom left corner of the first image area (associated with the first raster image file) on the mask layer relative to the values specified before ("StartX[pixels]": 15473, "StartY[pixels]": 45716). Since "X[pixels]": 0 and "Y[pixels]": 0, the bottom left corner of the first image area starts at X-coordinate 15473 (in pixels) and Y-coordinate 45716 (expressed in pixels).

The fields "XStartPixel" and "XEndPixel" indicate the start and end X-coordinate (in pixels) of the pixels to be imaged of the first raster image file. Thus, in this example, the entire first raster image file will be imaged. However, in other examples areas containing white parts may be skipped. Also, for some raster image files different parts thereof may be imaged using a different imaging mode.

Further, in the illustrated example, a second raster image file for imaging a second image area and a "filling" raster image file for imaging the non-functional area may be imaged using different imaging parameters. Below an example of a further portion of a descriptive file is discussed. This portion relates to a second raster image file "file2.tif" to be included on the mask layer, and the "filling" raster image file for imaging the non-functional area.

```
"HeadB" :
{
    "ImagingMode"       : 1,
    "Power[W]"          : 100,
    "Resolution[dpi]"   : 2000,
    "StartX[pixels]"    : 0,
    "StartY[pixels]"    : 0,
    "Images"            :
    [
        {
            "Name"          : "file2.tif",
            "Xsize[pixels]" : 14176,
            "Ysize[pixels]" : 28708,
            "X[pixels]"     : 4402,
            "Y[pixels]"     : 5800,
            "XStartPixel"   : 0,
            "XEndPixel"     : 14175
        },
        {
            "Name"          : "FILL.tif",
            "Xsize[pixels]" : 39376,
            "Ysize[pixels]" : 98512,
            "X[pixels]"     : 0,
            "Y[pixels]"     : 0,
            "XStartPixel"   : 0,
            "XEndPixel"     : 39375
        }
    ]
}
```

In this example, the second raster image file "file2.tif" and the filling raster image file "FILL.tif" will be imaged by "Head B" using imaging mode 1 which represents a preprogrammed set of imaging parameters, wherein a power percentage of 100% of the value included in the preprogrammed set is used, with a resolution of 2000 dpi. The field "StartX[pixels]" indicates the X-coordinate of a bottom left corner of an area for which imaging mode 1 and the resolution of 2000 dpi will be used. The field "StartY[pixels]" indicates the Y-coordinate of a bottom left corner of an area for which imaging mode 1 and the resolution of 2000 dpi will be used The fields "X[pixels]": 4402 and "Y[pixels]": 5800 indicate X and Y coordinates of a bottom left corner of the second image area (associated with the second raster image file) on the mask layer relative to the values specified before ("StartX[pixels]": 0, "StartY[pixels]": 0). Thus, the bottom left corner of the second image area starts at X-coordinate 4402 (in pixels) and Y-coordinate 5800 (expressed in pixels).

The fields "X [pixels]": 0 and "Y[pixels]": 0 indicate X and Y coordinates of a bottom left corner of the non-functional area (associated with the filling raster image file) on the mask layer relative to the values specified before ("StartX[pixels]": 0, "StartY[pixels]": 0). Thus, the bottom left corner of the non-functional area starts at X-coordinate 0 (in pixels) and Y-coordinate 0 (expressed in pixels).

To determine the imaging mode to be included in the descriptive job file, a program may analyze the at least one raster imaging file and the filling raster image file and select the most appropriate imaging mode(s) and/or resolution(s) for imaging those files from a list of preprogrammed imaging modes and resolutions. The determining may, on the one hand try to minimize a total amount of imaging time required for imaging the at least one image area and the non-functional area, and on the other hand, select the most appropriate imaging mode(s) and/or resolution(s) for imaging the at least one raster image file taking into account e.g., the type of plate and/or operator wishes. In another embodiment the imaging mode may be chosen by an operator. For example, an operator may wish to use a particular imaging mode for imaging certain raster image files.

It is further noted that the raster image files referred to in the descriptive job file may be raster image files for which a surface screen is included, i.e. for which a sampling pattern was overlaid over the original image data, typically at least in the solid and/or in a portion of the half-tone areas. For the at least one rater image file line File1.tif or File2.tif this may be a sampling pattern as disclosed in patent application N2031133 in the Netherlands in the name of the applicant, which is included herein by reference. For the filling raster image file, a different sampling pattern may be included, typically a sampling pattern with more imaging pixels than non-imaging pixels, for which the repetition distance between identical groups of imaging/non-imaging pixels is relatively large, e.g. larger than 1 mm, or larger than 3 mm or larger than 5 mm or even larger than 10 mm, e.g. between 1 and 50 mm, preferably between 2 and 40 mm, more preferably between 3 and 35 mm. Such sampling patterns may either be included in the raster image files as described above, or they may be added in the hardware right before the imaging step, as explained in detail in patent application WO 2021/110832 A1 in the name of the applicant and in the above cited patent application N2031133, which are included herein by reference. To that end the descriptive job file may also indicate a type of sampling pattern to be added to a raster image file during imaging.

The descriptive job file may further indicate any one or more of the following:
- an identifier of the job,
- a width and height of the plate,
- a thickness of the plate,
- a type of the plate,
- a brand of the plate,
- a name of the plate,
- a reference to a preview file containing low-resolution image data of the images to be imaged on the plate.

In the example illustrated above, the image job data is prepared as a descriptive job file including references to the at least one raster image file and to a filling raster image file including the filling imaging data, wherein position data is included in the descriptive job file to indicate the positions of the respective raster image files referred to.

In another possible example, the image job data is prepared as a combined raster image file including pixel data from the at least one raster image file arranged in at least one corresponding image area of a mask area, and pixel data for the non-functional area of the mask area corresponding to the filling imaging data. In that case, it is not required to include position data, as this is implicit from the layout of the combined image.

FIG. 2A illustrates how imaging data of multiple raster image files may be arranged in corresponding image areas 10 of a layout frame 20 corresponding with an area of a mask layer to be imaged. For example, a user may be provided with a graphical user interface allowing the user to associate multiple raster image files with corresponding image areas 10 in the layout frame 20.

Figure 2B:
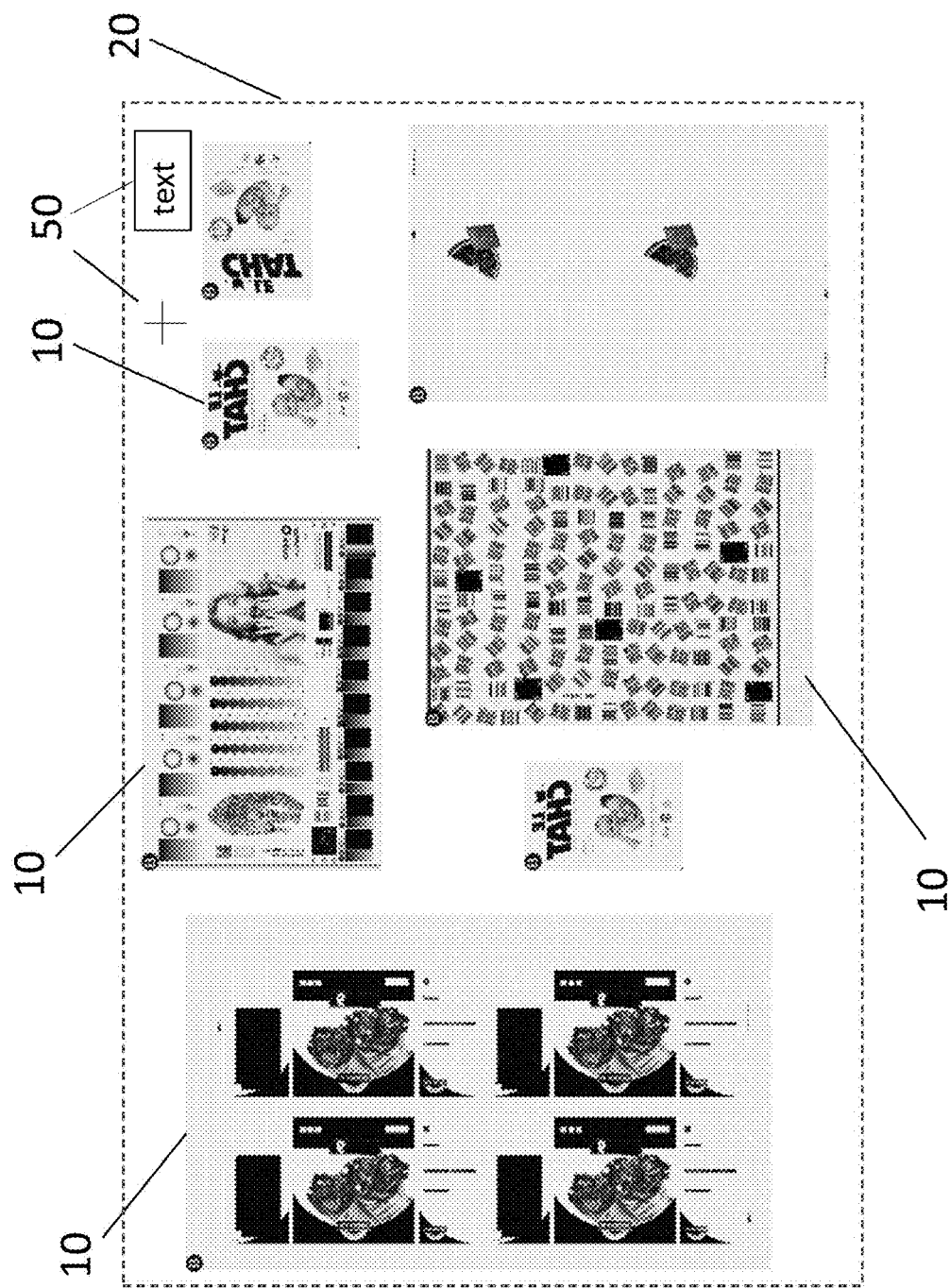
FIG. 2B shows the layout of FIG. 2A where an additional cutting or registration mark and text portion have been added.

Optionally also other indications, such as registration and/or cutting marks and/or text and/or an identifier, such as a bar code, may be included in the layout as is known to a person skilled in the art. In embodiments of the invention, such indications may be added to the layout of FIG. 2A using indication raster image files associated with corresponding indication image areas 50. FIG. 2B shows two indication image areas 50: a cutting or registration mark image area and a text image area. Only one cutting or registration mark image area 50 is shown in FIG. 2B, but typically multiple registration and/or cutting mark image areas may be included. Such indication image area(s) 50 may be achieved by including a reference to the corresponding indication raster image file in the descriptive job file and by adding position data and/or a set of imaging parameters for imaging the indication image area(s) 50.

This can be done in the same way as described above for the at least one rater image file and associated at least one image area 10.

Such marks and identifiers may be placed in an edge area of the mask layer or adjacent/between the at least one image area 10, i.e. basically anywhere where no image need to be present. In other embodiments, a mark or identifier may be located within the at least one image area 10, e.g. when an image area includes a non-used portion or requires an identifier or when they are imaged/developed with a lower height, see further. After development, the marks and identifiers may have the same height as the printing portions of the at least one image area 10 or a lower height. Examples of ways to add identifiers are disclosed in patent specification WO2019110809A1 in the name of Flint Group Germany, which is included herein by reference.

According to some embodiments a mark such as a registration mark and/or a cutting mark, and/or text, and/or an identifier such as a bar code, is located within the at least one image area 10. This ensures that all useful information for the subsequent steps is included in the at least one image area.

According to some embodiments the filling imaging data does not include a mark image area such as a registration mark image area and/or a cutting mark image area, and/or the filling imaging data does not include a text image area, and/or the filling imaging data does not include an identifier image area such as a bar code image area. With this feature the filling imaging data does not include information which can be useful during the treatment of the precursor. The parts, such as the non-functional area, which include the filling imaging data may be discarded safely.

According to some embodiments the height of the reliefs in the non-functional area 30 is substantially the same as the height of the reliefs in at least one of the at least one image area 10.

In case the height of the marks or identifiers is lower than the printing portions, they may be placed in non-printing parts of the at least one image area 10. Such marks and/or identifiers with lower height may be achieved by exposing the plate through the mask layer with respective different amounts of energy of actinic radiation, using e.g. an UV exposure unit configured to change the exposure time and/or exposure intensity and/or the number of exposure passes and/or by using different optical structures between the UV exposure unit and the plate. In addition or alternatively, such marks and/or identifiers may be achieved by suitable choosing the imaging settings during imaging, e.g. by using a smaller beam size and/or reducing the imaging time. Another option is to generate small spots, e.g. ablated spots, on the mask at such a distance with respect to each other that only volumes within the photosensitive layer of the plate are sufficiently cured where the beams of the electromagnetic radiation used for curing overlap. In volumes where there is no overlap of the beams, the curing is insufficient and those portions will be removed during the developing step.

Figure 3:
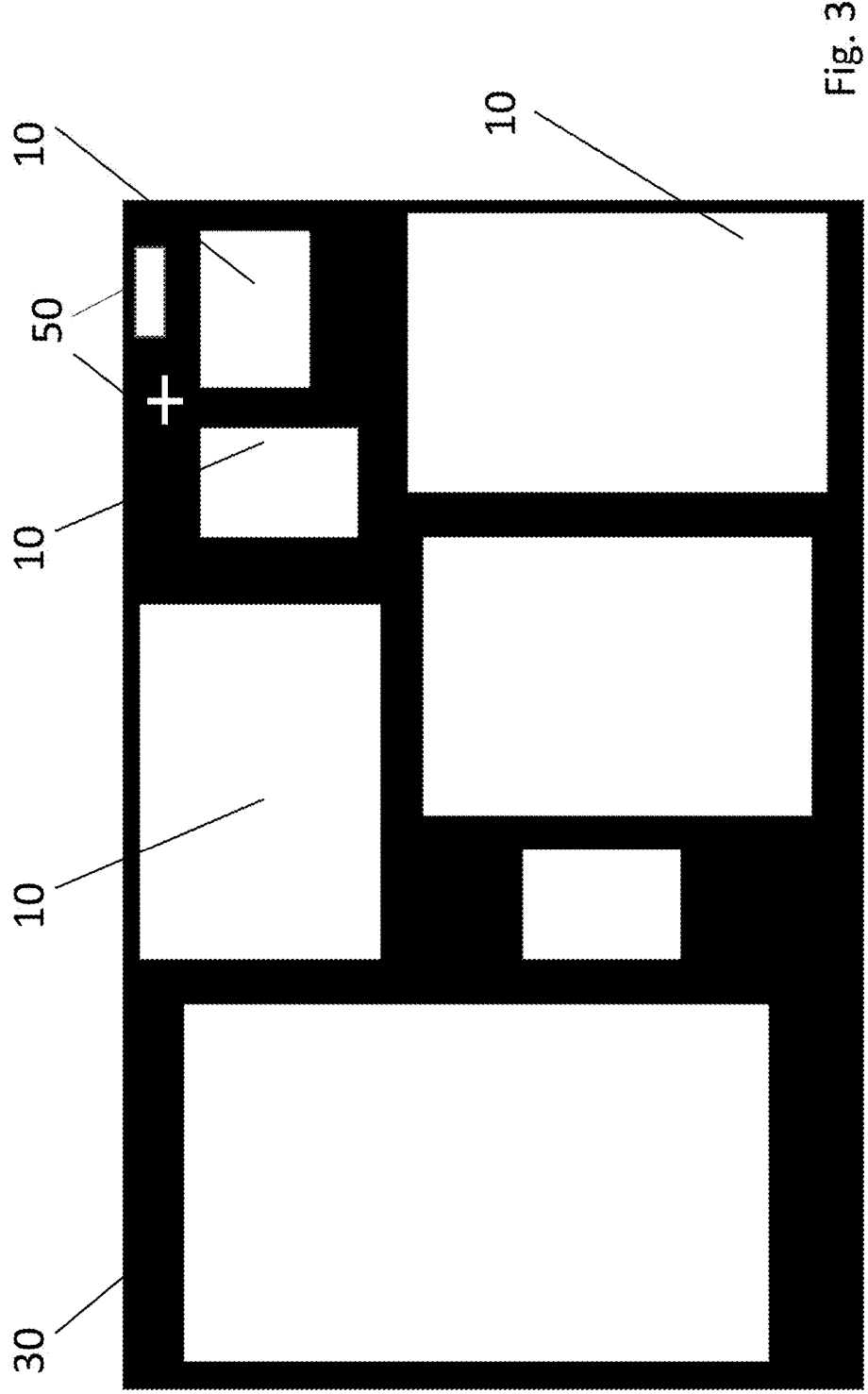
FIG. 3 shows a non-functional area after it has been determined, with the black part in this figure indicating the non-functional area and the white parts indicating the image areas.

FIG. 3 illustrates a non-functional area 30 of the mask layer outside of the image areas 10. In this non-functional area 30 imaging data is included, for example a repetitive pattern of imaging and non-imaging pixels, as will be explained below. However, it is also possible to include only imaging pixels, i.e. one big solid area. Also, the pattern may be an irregular non-repetitive pattern. Also, some parts of the non-functional area may comprise a repetitive pattern and other may comprise a solid area. For example, solid areas (with only imaging pixels) may be provided adjacent a leading and a trailing edge of the plate in order to have a thicker plate where a transport bar is fixed to the plate.

Figure 4:
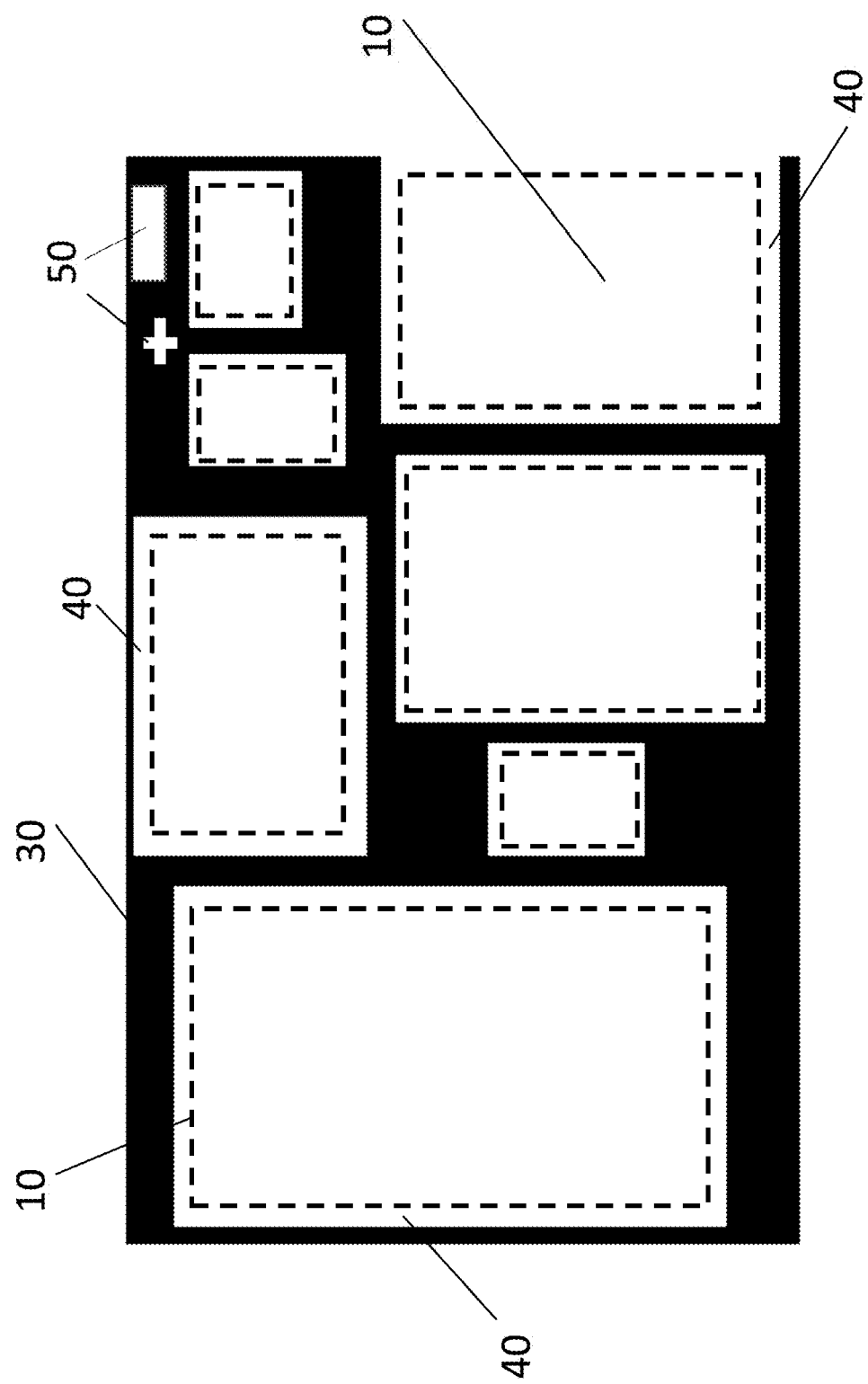
FIG. 4 shows the non-functional area after a border of non-imaging pixels has been added to the image areas.

As illustrated in FIG. 4, optionally a border 40 of non-imaging pixels may be included around each image area 10. This may be advantageous for facilitating the cutting of the plate: indeed, these borders, after development will be recessed borders allowing for an improved cutting of the plate. Optionally a border may also be added around an indication image area 50.

Figure 5:
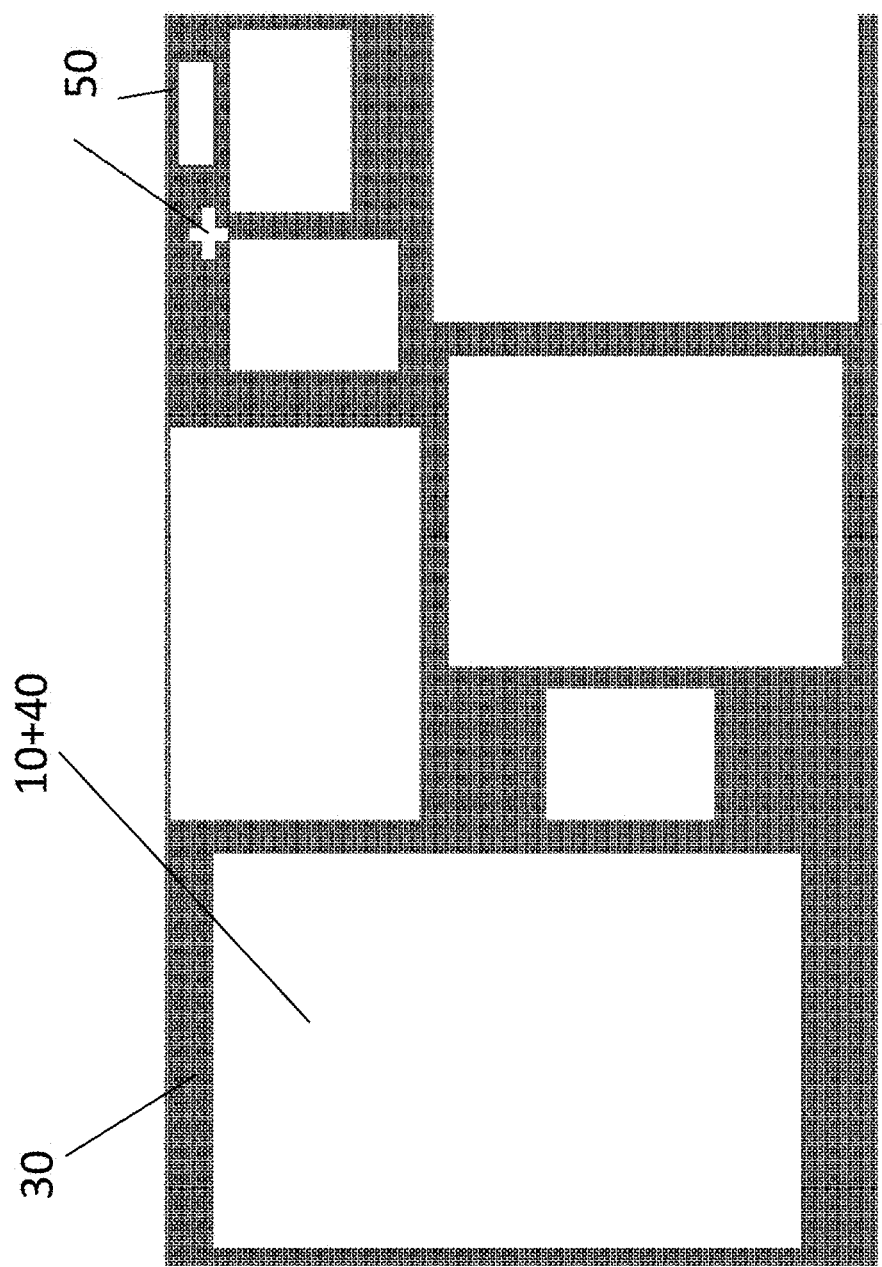
FIG. 5 shows the non-functional area after the imaging pixels have been added to it.

FIG. 5 illustrates the adding of a pattern of imaging and non-imaging pixels in the non-functional area 30. Such patterns are typically imaged with a relative low resolution in order to limit the time needed for the imaging. The resolution may be the same as the resolution of one of the image areas 10. Optionally, the different image areas may have different resolutions and/or different portions of the non-functional area may have different resolutions.

Figure 6:
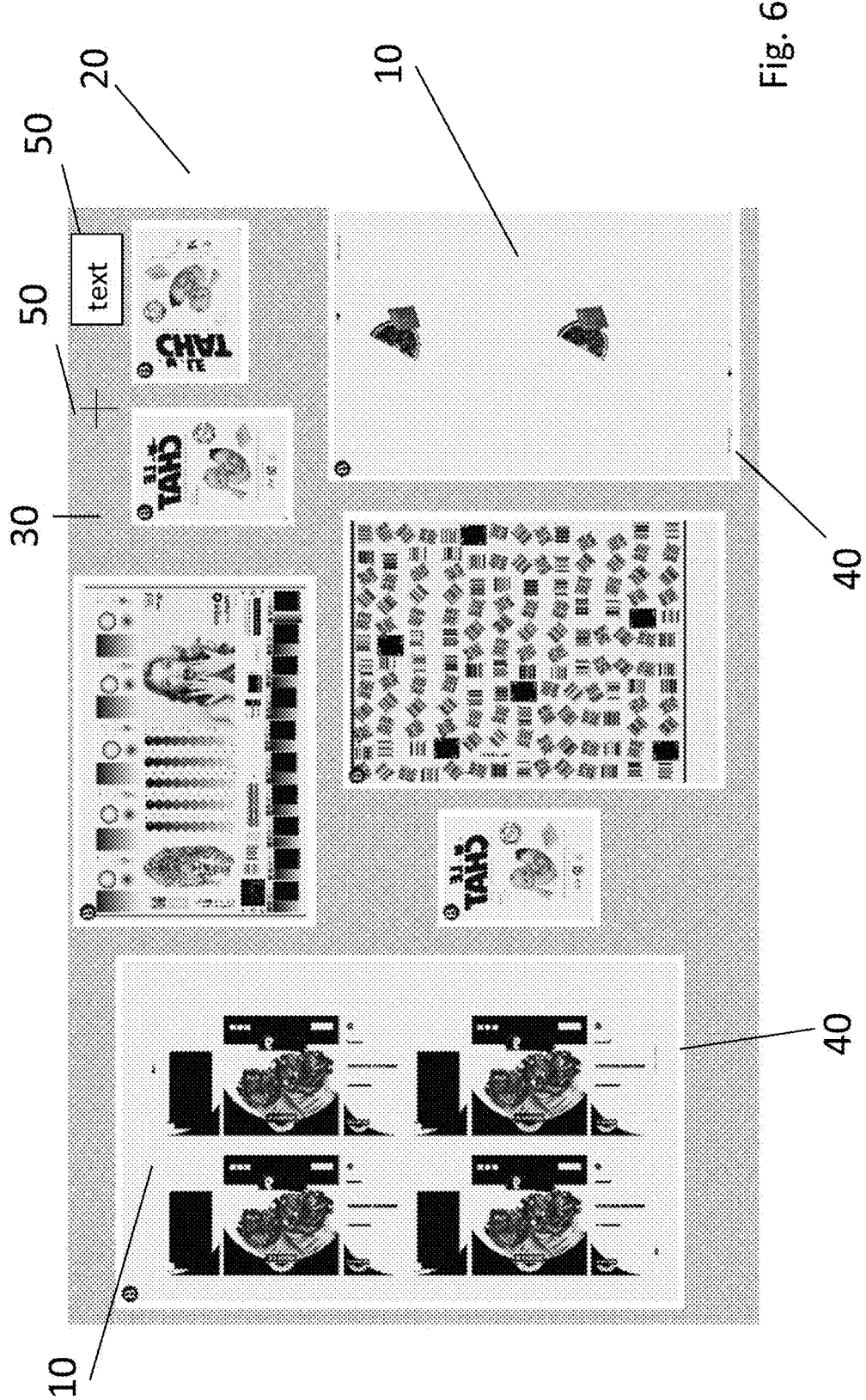
FIG. 6 shows the layout on the relief precursor area with the raster image files and the filling raster image file added.

FIG. 6 shows the resulting layout which will be imaged on the mask layer.

Figure 8:
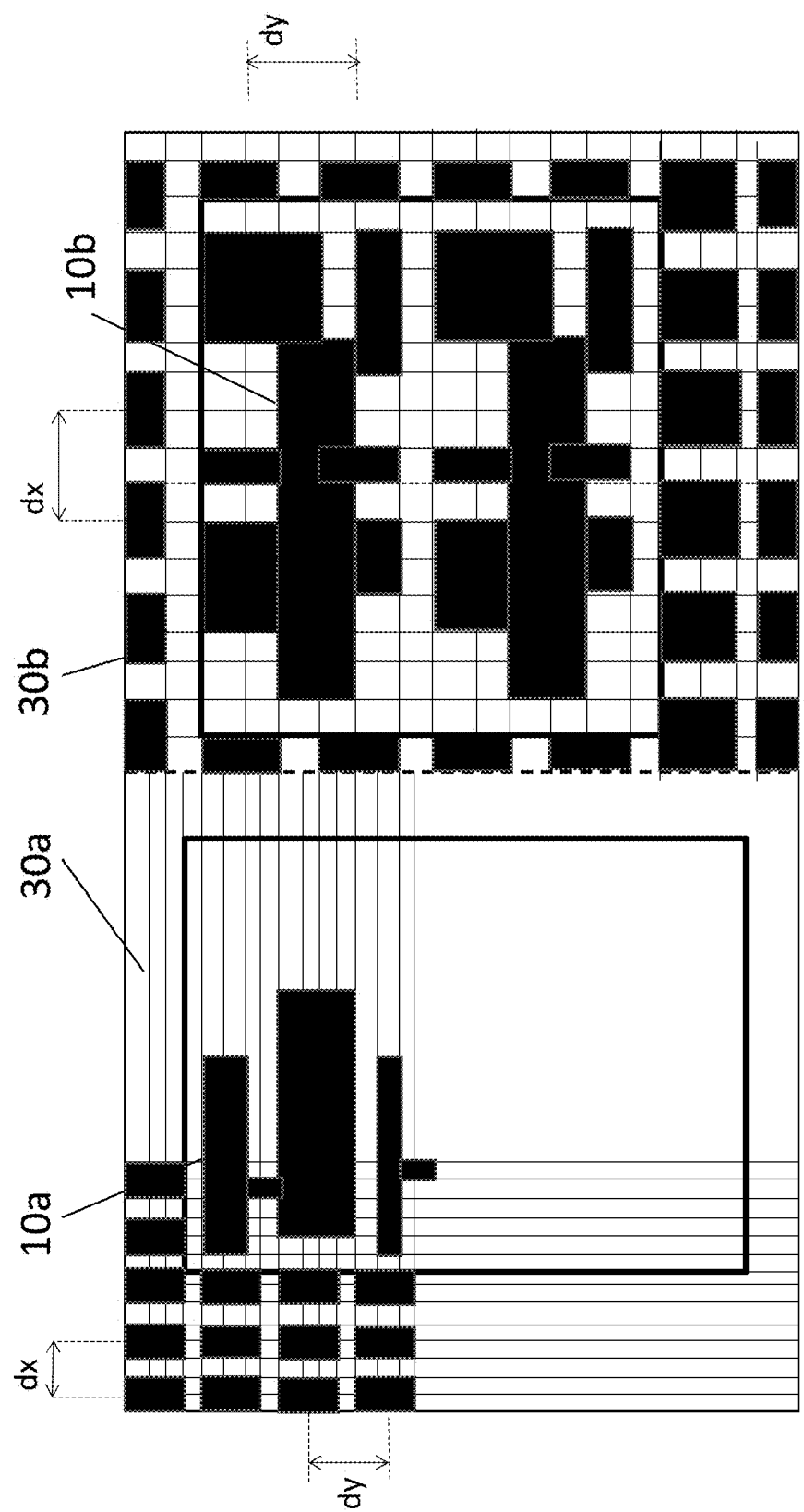
FIG. 8 illustrates a first exemplary embodiment of a layout with two raster image files and a filling raster image file.

FIG. 8 illustrates an example with two image areas 10*a*, 10*b* having respective resolution R1, R2 and a non-functional area 30 with a first portion 30*a* surrounding the first image area 10*a* with a resolution R1 and a second portion 30*b* surrounding second image area 10*b* with a resolution R2. This will allow to image the first image area 10*a*, and the first portion 30*a* of the non-functional area during the same pass with the first resolution R1 and to image the second image area 10*b*, and the second portion 30*b* of the non-functional area during the same pass with the second resolution R2. In this way the imaging time needed will not be significantly increased as compared to a situation where the non-functional area is not imaged.

Pixels are shown in a portion of areas 30*a* and 10*a*, wherein the black parts are parts with imaging pixels, and the white squares are non-imaging pixels. In the non-functional area 30*a*, a pattern of rectangles each including 6 (2×3) pixels is used, and the rectangles are spaced apart over a distance dx, dy of two pixels in the X direction and 4 pixels in the Y-direction. The second resolution R2 is lower than the first resolution. Lower resolution pixels are shown in areas 30*b* and 10*b*, wherein the black parts are parts with imaging pixels, and the white squares are non-imaging pixels. In the non-functional area 30*b*, a pattern of squares each including 4 (2×2) pixels is used, and the squares are spaced apart over a distance dx, dy of three pixels in the X direction and in the Y-direction. Note that this figure is merely for explanation purposes and is not drawn to scale: typically the size of the pixels is much smaller as compared to the size of an image area, and the sampling pattern used in the non-functional area typically contains more imaging pixels with a repetition distance dx, dy which is larger.

Figure 9:
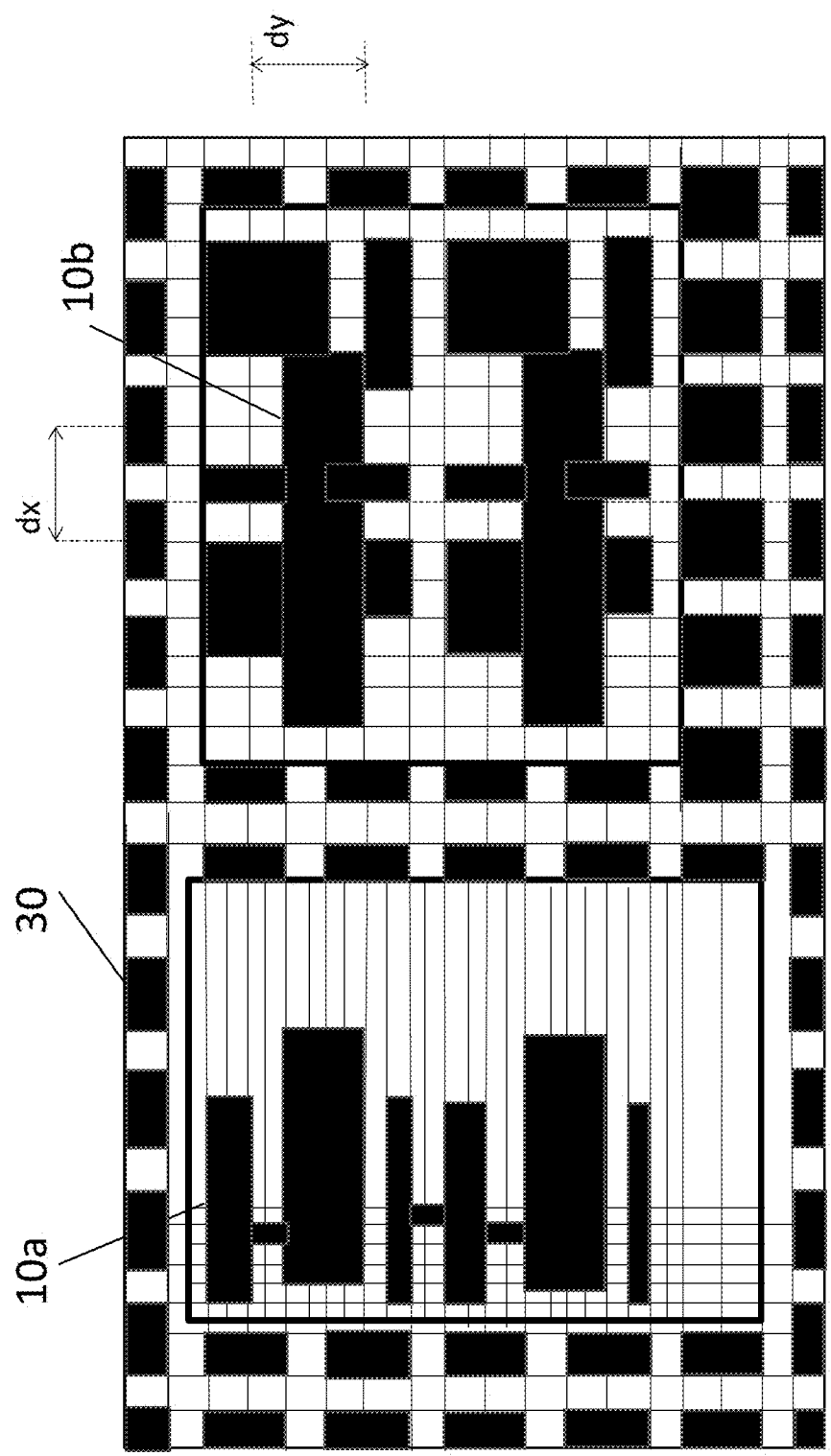
FIG. 9 illustrates a second exemplary embodiment of a layout with two raster image files and a filling raster image file.

In another example illustrated in FIG. 9 a resolution for the non-functional area 30 may be the same in the entire non-functional area and may correspond e.g., to a resolution used for imaging one of the image areas 10*a*, 10*b* or a resolution that adds the least amount of exposure time. Here the resolution R2 of the second image area 10*b* was chosen for the non-functional area 30. In such a case the non-functional area 30 may be imaged together with the image area 10*b* having the same resolution R2 in a first pass and the image area 10*a* having a different resolution R1 may be imaged in another pass.

Figure 7:
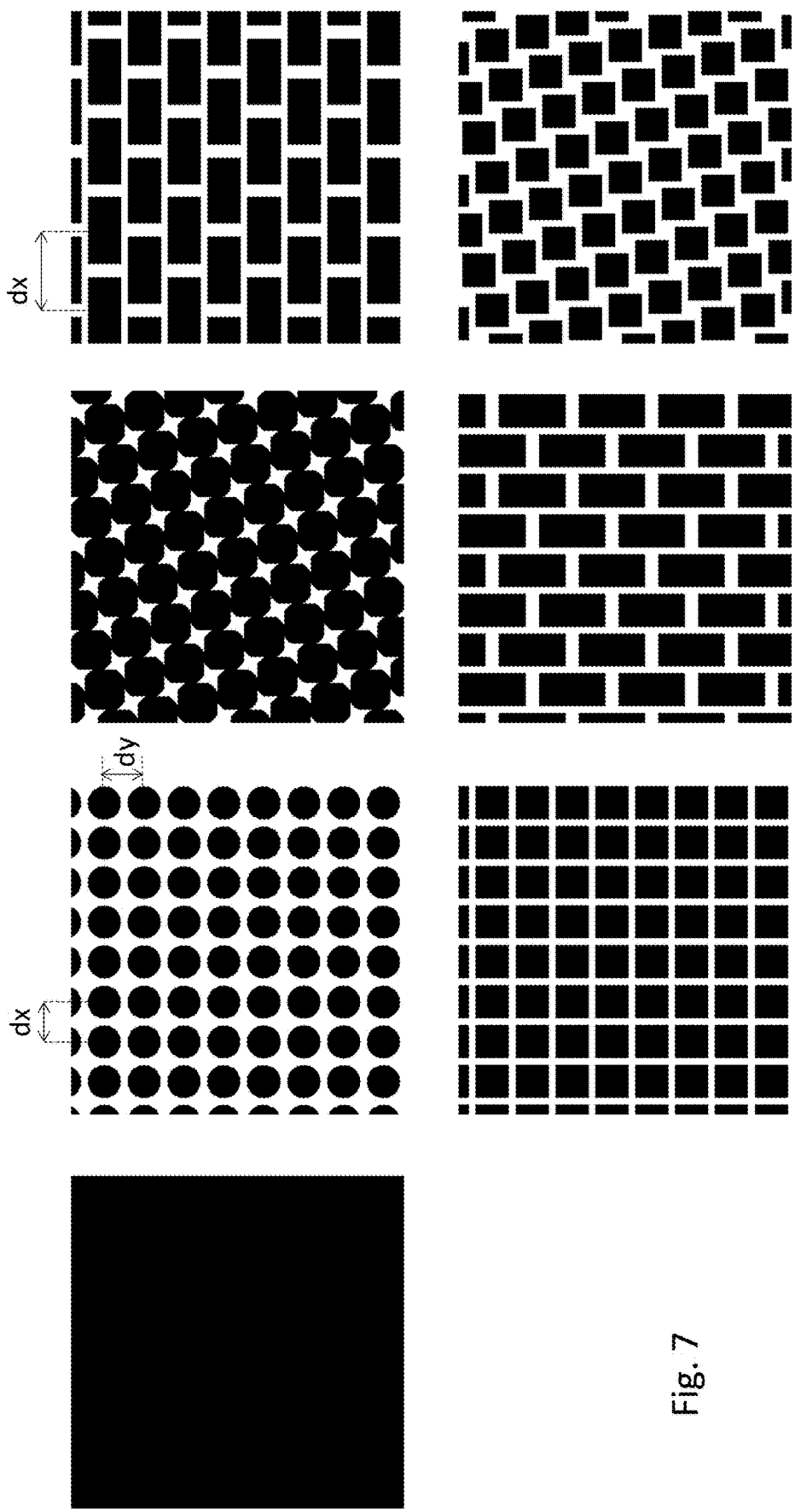
FIG. 7 illustrate a number of possible patterns that may be used to image the non-functional area.

FIG. 7 illustrates a number of possible sampling patterns which may be used in the non-functional area 30, 30*a*, 30*b*. A repetition distance dx, dy in the X and Y-direction between two adjacent imaging portions is typically between 1 mm and 50 mm, preferably between 2 mm and 40 mm, more preferably between 3 mm and 35 mm. Preferably, at least 10%, more preferably at least 20%, even more preferably at least 30%, most preferably at least 50%, and for example at least 70% of the pixels added in the non-functional area 30 are imaging pixels. Such preferred percentages will be achieved with the illustrated patterns.

Embodiments of the invention also relate to a computer program or computer program product or digital storage medium comprising computer-executable instructions or encoding a machine-executable program of instructions, to control the method, when the program is run on a computer, of any one of the previous embodiments. Some steps of the method may involve interaction with a user, e.g. through a user interface, whilst other steps will be fully performed in an automated way. For example, the arranging of the at least one raster image file in a layout frame may be done by manipulation of a user, whilst the data to be included in the descriptive job file, such as position data and the adding of imaging pixels in the non-functional area may be calculated automatically once the user confirms the layout.

Figure 10:
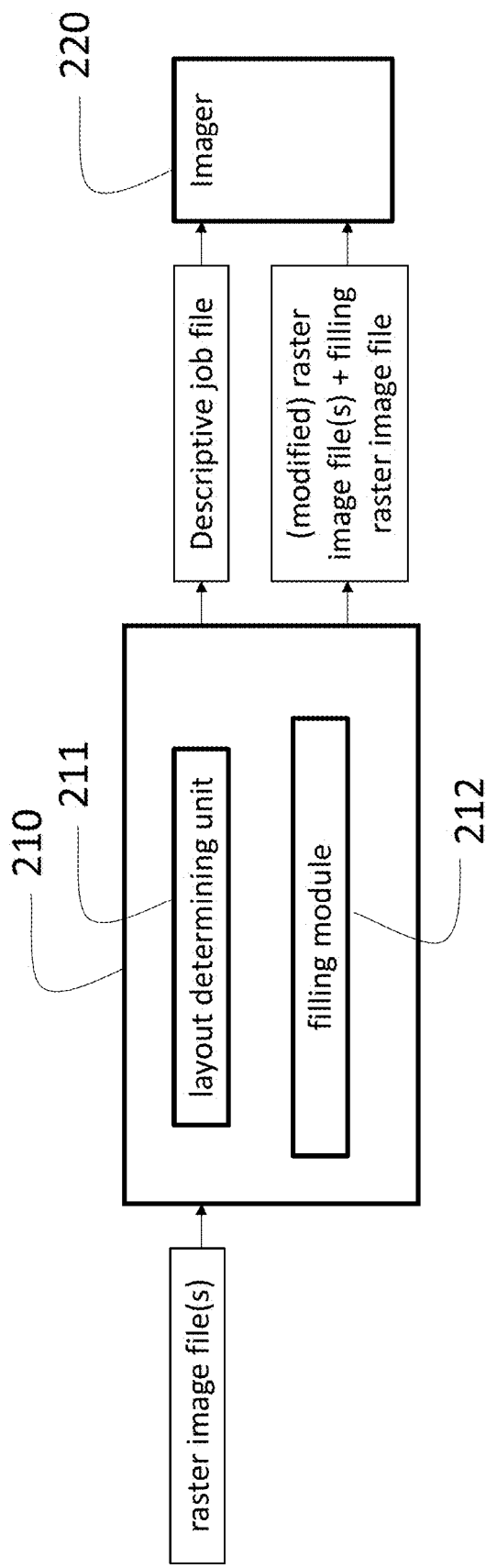
FIGS. 10 and 11 are schematic diagrams illustrating exemplary embodiments of a mask layer imaging system.
Figure 11:
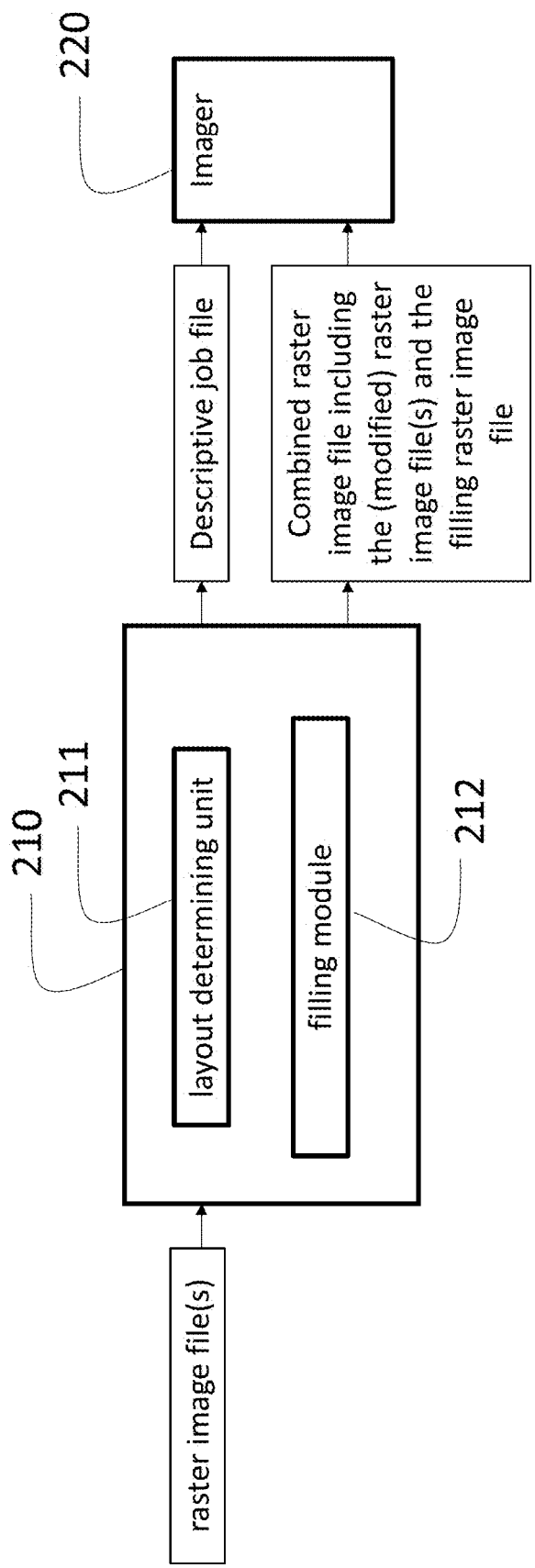

FIGS. 10 and 11 illustrate an embodiment of a mask layer imaging system comprising a controller 210 and an imager 220 configured to image the mask layer according to the image job data from the controller 210. The controller 210 is configured to prepare image job data for imaging a mask layer which needs to be imaged in at least one image area based on at least one raster image file. The controller 210 comprises a layout determining module 211 and a filling module 212.

The layout determining module 211 is configured to receive at least one raster image file, and include data relative to the at least one raster image file in the image job data, e.g. a descriptive job file, so as to image the at least one corresponding image area (cf. the areas 10 in FIGS. 2-6) of the mask layer. Optionally, the layout determining module 211 is configured, in order to include data relative to the at least one raster image file in the image job data, to provide a graphical interface for arranging the at least one raster image file in at least one corresponding image area of a frame corresponding with a mask area. In this way, a user can input a desired layout on the mask layer. In the embodiment of FIG. 10, the layout determining module 211 may be configured to determine position data for the at least one raster image file, and to include a reference to the at least one raster image file as well as the associated position data in the descriptive job file.

The filling module 212 is configured to determine a non-functional area of the mask layer outside of at least one image area, and to include filling imaging data in the image job data for imaging the non-functional area (cf. the areas 30 in FIGS. 2-6). The filling module 212 may be configured to generate a filling raster image file for imaging the non-functional area. The filling raster image file may for example include a pattern as illustrated above with reference to FIGS. 7-9. In the embodiment of FIG. 10, the filling module 212 may be configured to include a reference to the filling raster image file in the image job data.

In the embodiment of FIG. 11, the layout determining module 211 and the filling module 212 are integrated and configured to generate a combined raster image file including data from the at least one raster image file in the at least one image area and data from the filling raster image file in the non-functional area.

Preferably, the filling module 212 is configured to include the filling imaging data such that at least 10%, preferably at least 20%, preferably at least 30%, more preferably at least 50%, even more preferably at least 70% of the pixels added in the non-functional area are imaging pixels. According to some other embodiments, the filling module 212 is configured to include the filling imaging data such that less than 10% of the pixels added in the non-functional area are imaging pixels.

Preferably, the filling module 212 is configured to include in the image job data, e.g. in a descriptive job file, at least one imaging parameter set with at least one imaging parameter for imaging the non-functional area, preferably taking in account a total amount of imaging time required for imaging the at least one image area and the non-functional area using the at least one imaging parameter set. For example, the filling module 212 may be configured to select an imaging parameter set from a list of imaging parameter sets for imaging the non-functional area taking into account a total amount of imaging time required for imaging the at least one image area and the non-functional area.

In an exemplary embodiment, the filling module 212 may be configured to select an imaging parameter set for imaging at least a part of the non-functional area including a resolution identical to the resolution used for imaging an image area of the at least one image area, see also the example discussed above in connection with FIG. 9. Also, the filling module 212 may be configured to specify in the image job data a same resolution for imaging substantially the entire non-functional area.

In a further developed embodiment, the filling module 212 may be configured to select a first imaging parameter set, for example comprising a first resolution, for a first portion of the non-functional area and a second imaging parameter set, for example comprising a second resolution different from the first resolution, for a second portion of the non-functional area, see also the example discussed above in connection with FIG. 10.

Optionally, the filling module 212 is configured to include filling imaging data in said image job data such that a border around at least one of the at least one image area is not imaged, see also the example discussed above in connection with FIG. 4.

Optionally, the filling module 212 is configured to include a pattern of imaging and non-imaging pixels in said non-functional area, optionally with the exception of a border of non-imaging pixels around at least one of the at least one image area. The pattern may comprise groups of at least four adjacent imaging pixels, preferably at least six adjacent imaging pixels, separated by non-imaging pixels, e.g. squares of at least four adjacent imaging pixels separated by lines. See also the examples illustrated in FIG. 7. The pattern may be a repetitive pattern with a repetition distance (dx, dy) between 5 and 50 mm.

Optionally, the layout determining module 211 is configured to overlay at least one surface screen of imaging and non-imaging pixels over a solid area and/or a half-tone area of the at least one raster image file to obtain at least one modified raster image file, wherein said surface screen may be the same or different for each raster image file to be included. In the embodiment of FIG. 10, the descriptive job file may then comprise a reference to the at least one modified raster image file, and the at least one modified raster image file may be sent separately to the imager. In the embodiment of FIG. 10, the at least one modified raster image file may be included in the combined raster image file.

In yet other embodiments, as explained above, such surface screen (also called a sampling pattern) may also be added in the imager in solid and/or halftone areas of the at least one image areas. In that case, the descriptive job file may specify which surface screen to apply.

In preferred embodiments, the added pattern is different from a pattern of the surface screen. Typically, the added pattern has a repetition distance, which is much larger than a repetition distance of a surface screen pattern.

According to some preferred embodiments the step of including the filling imaging data in said image job data for imaging said non-functional area is carried out so that solid and/or halftone dots in the non-functional area are relief areas having their surface at the top surface of the plate. The solid and/or halftone dots in the non-functional area may extend from the top surface of the plate to the floor of the plate. The height of a solid and/or halftone dot is in this case the distance of the surface of the dot (and of the plate surface) to the floor. Thanks to this feature there is no photosensitive material on top of the solid and/or halftone dots in the non-functional area that needs to be washed away during the washing process, and accordingly less liquid will be needed during the washing process.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Whilst the principles of the invention have been set out above in connection with specific embodiments, it is to be understood that this description is merely made by way of example and not as a limitation of the scope of protection, which is determined by the appended claims.

The invention claimed is:

1. A method of preparing image job data for imaging a mask layer, comprising:
receiving at least one raster image file,
preparing image job data for imaging the mask layer, said preparing comprising:
including data relative to the at least one raster image file in the image job data so as to image at least one corresponding image area of the mask layer;
determining a non-functional area of the mask layer outside of the at least one corresponding image area; and
including filling imaging data in said image job data for imaging said non-functional area, the filling imaging data being such that at least 10% of the pixels added in said non-functional area are imaging pixels.

2. The method according to claim 1, wherein preparing the image job data comprises preparing a descriptive job file including references to the at least one raster image file or to at least one modified raster image file based on the at least one raster image file and to a filling raster image file for imaging said non-functional area, said descriptive job file being used in combination with the at least one raster image file or the at least one modified raster image file and the filling raster image file.

3. The method according to claim 2, wherein the data relative to the at least one raster image file comprise image position data indicating a position of the at least one corresponding image area on the mask layer and/or wherein the filling imaging data comprise filling position data indicating a position of the non-functional area, and wherein the image position data and/or the filling position data are included in the descriptive job file.

4. The method according to claim 2, wherein the descriptive job file includes a reference to at least one indication raster image file associated with an indication area, such as a cutting mark area or an identifier area, said descriptive job file being used in combination with the at least one indication raster image file.

5. The method according to claim 1, wherein the data relative to the at least one raster image file comprise image position data indicating a position of the at least one corresponding image area on the mask layer and/or wherein the filling imaging data comprise filling position data indicating a position of the non-functional area.

6. The method according to claim 1, wherein the at least one raster image file comprises at least two raster image files having different resolutions.

7. The method according to claim 6, wherein including the at least one imaging parameter set for imaging the non-functional area comprises:
choosing from a list of imaging parameter sets for imaging the non-functional area to reduce or optimize a total amount of imaging time required for imaging the at least one image area and the non-functional area;
wherein optionally an imaging parameter set selected for imaging at least a part of the non-functional area includes a resolution identical to the resolution used for imaging an image area of the at least one image area;
wherein optionally the at least one imaging parameter set comprises a first imaging parameter set for a first portion of the non-functional area and a second imaging parameter set for a second portion of the non-functional area.

8. The method according to claim 1, comprising including in the image job data at least one imaging parameter set of at least one imaging parameter for imaging the non-functional area.

9. The method according to claim 1, wherein including in the image job data the at least one imaging parameter set for imaging the non-functional area comprises specifying a first resolution for imaging a first non-functional zone, and a second different resolution for imaging a second non-functional zone.

10. The method according to claim 1, wherein including in the image job data the at least one imaging parameter set for imaging the non-functional area comprises specifying a same resolution for imaging the entire non-functional area; and/or
wherein including filling imaging data in said image job data is such that a border around at least one of the at least one image area is not imaged; and/or
wherein the non-functional area is determined so that the combination of the at least one image area and the non-functional area cover the entire printable area of the mask layer.

11. The method according to claim 1, wherein including filling imaging data in said image job data for imaging said non-functional area comprises including a pattern of imaging and non-imaging pixels in said non-functional area, optionally with the exception of a border of non-imaging pixels around at least one of the at least one image area;
wherein the pattern comprises groups of at least four adjacent imaging pixels, separated by non-imaging pixels, e.g. squares of at least four adjacent imaging pixels separated by lines.

12. The method of claim 11, further comprising overlaying at least one surface screen of imaging and non-imaging pixels over a solid area and/or a half-tone area of the at least one raster image file to obtain at least one modified raster image file, wherein said surface screen may be the same or different for each raster image file to be included, wherein the image job data comprise the at least one modified raster image file or a reference to the at least one modified raster image file; wherein the added pattern is different from a pattern of the surface screen.

13. The method according to claim 1, further comprising overlaying at least one surface screen of imaging and non-imaging pixels over a solid area and/or a half-tone area of the at least one raster image file to obtain at least one modified raster image file, wherein said surface screen may be the same or different for each raster image file to be included, wherein the image job data comprise the at least one modified raster image file or a reference to the at least one modified raster image file.

14. A computer program encoded in a non-transitory memory, the computer program comprising computer-executable instructions to control the method, when the program is run on a computer, of claim 1.

15. The method of claim 1, wherein including the filling imaging data in said image job data for imaging said non-functional area is carried out so that solid and/or half-tone dots in the non-functional area are relief areas having their surface at the top surface of the plate.

16. The method of claim 1, wherein a mark such as a registration mark and/or a cutting mark, and/or text, and/or an identifier such as a bar code, is located within the at least one image area; wherein the filling imaging data does not include a mark image area such as a registration mark image area and/or a cutting mark image area, and/or the filling imaging data does not include a text image area, and/or the filling imaging data does not include an identifier image area such as a bar code image area.

17. A controller configured to prepare image job data for imaging a mask layer which needs to be imaged in at least one image area based on at least one raster image file, the controller comprising a filling module configured to:
determine a non-functional area of the mask layer outside of at least one image area, and
include filling imaging data in said image job data for imaging said non-functional area, such that at least 10% of the pixels added in said non-functional area are imaging pixels.

18. The controller of claim 17, wherein the filling module is configured to generate a filling raster image file for imaging the non-functional area.

19. A controller according to claim 18, further comprising a layout determining module configured to:
receive at least one raster image file, and
include data relative to the at least one raster image file in the image job data so as to image the at least one corresponding image area of the mask layer.

20. The controller of claim 19, wherein the layout determining module is configured to include a reference to the at least one raster image file or to at least one modified raster image file based on the at least one raster image file in the image job data; and/or
wherein the layout determining module is configured to determine position data for the at least one raster image file, and to include the position data in the image job data; and/or
wherein the layout determining module and the filling module are integrated and configured to generate a combined raster image file including data from the at least one raster image file in the at least one image area and data from the filling raster image file in the non-functional area; and/or wherein the controller is configured to transmit the image job data as a descriptive job file together with the filling raster image file and the at least one raster image file to an imager.

21. The controller of claim 17, wherein the filling module is configured to include the filling imaging data such that at least 20% of the pixels added in said non-functional area are imaging pixels.

22. The controller of claim 17, wherein the filling module is configured to include in the image job data at least one imaging parameter set with at least one imaging parameter for imaging the non-functional area.

23. The controller of claim 22, wherein the filling module is configured to select at least one of an imaging parameter set from a list of imaging parameter sets for imaging the non-functional area taking into account a total amount of imaging time required for imaging the at least one image area and the non-functional area; an imaging parameter set for imaging at least a part of the non-functional area including a resolution identical to the resolution used for imaging an image area of the at least one image area; a first imaging parameter set, for example comprising a first resolution, for a first portion of the non-functional area and a second imaging parameter set, for example comprising a second resolution different from the first resolution, for a second portion of the non-functional area; a same resolution in the image job data for imaging the entire non-functional area.

24. The controller of claim 17, wherein the filling module is configured to include filling imaging data in said image job data such that a border around at least one of the at least one image area is not imaged.

25. The controller of claim 17, wherein the filling module is configured to include a pattern of imaging and non-imaging pixels in said non-functional area, optionally with the exception of a border of non-imaging pixels around at least one of the at least one image area;

wherein the pattern comprises groups of at least four adjacent imaging pixels, separated by non-imaging pixels, e.g. squares of at least four adjacent imaging pixels separated by lines.

26. The controller according to claim 25, wherein the layout determining module is configured to overlay at least one surface screen of imaging and non-imaging pixels over a solid area and/or a half-tone area of the at least one raster image file to obtain at least one modified raster image file, wherein said surface screen may be the same or different for each raster image file to be included, wherein the image job data comprise the at least one modified raster image file or a reference to the at least one modified raster image file;

wherein the added pattern is different from a pattern of the surface screen.

* * * * *